July 23, 1929.  G. MEINERS  1,722,152
RECTIFYING SYSTEM
Filed Feb. 26, 1927
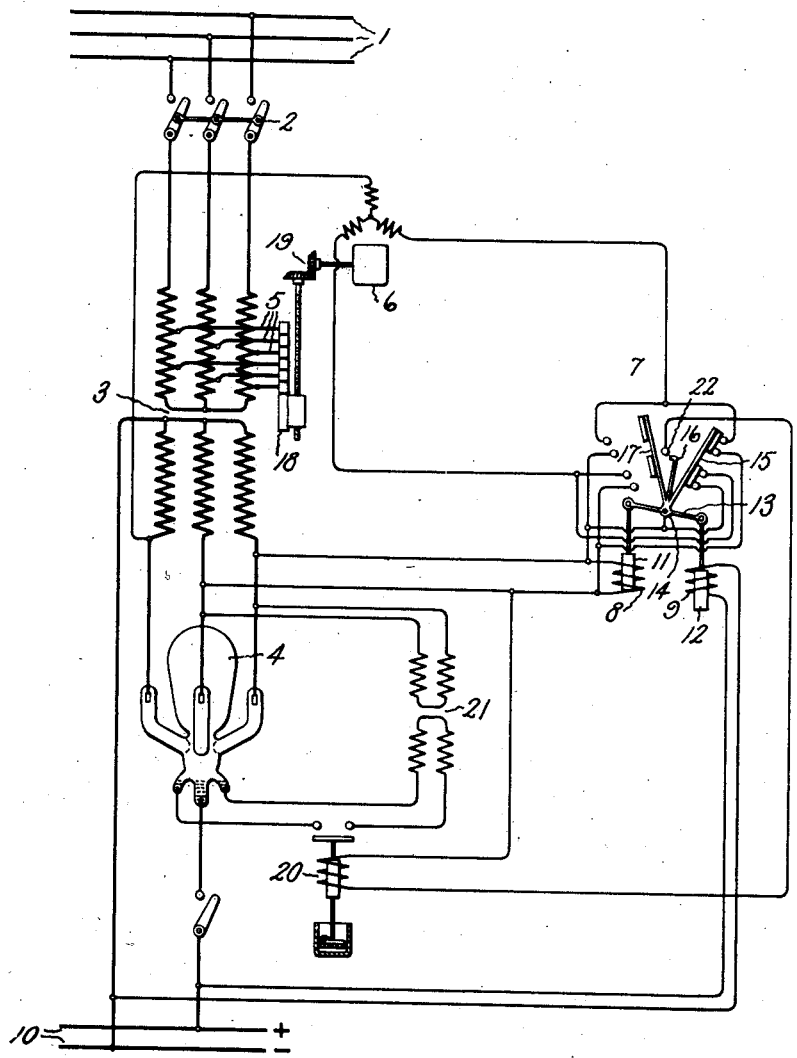
Inventor:
Gustav Meiners,
by
His Attorney.

Patented July 23, 1929.

1,722,152

UNITED STATES PATENT OFFICE.

GUSTAV MEINERS, OF PLOTZENSEE, GERMANY, ASSIGNOR TO GENERAL ELECTRIC COMPANY, A CORPORATION OF NEW YORK.

RECTIFYING SYSTEM.

Application filed February 26, 1927, Serial No. 171,329, and in Germany March 17, 1926.

My invention relates to rectifying systems wherein alternating and direct current circuits are interconnected through means comprising a vapor arc rectifier or the like, and has for its principal object the provision of an improved apparatus and method of operation whereby the rectifier is put into operation when a predetermined relation is established between the electrical conditions of the direct and alternating current circuits.

In order to be able to put into operation a rectifier station which feeds a direct current system through a remote control switch or a motor-controlled switch, there must be equality of voltage or a predetermined voltage ratio between the voltages of the rectifier and the system.

Automatic parallel connection devices are already known in which a differential voltage relay is provided whose one coil is connected to the rectifier voltage in front of the remote control switch and whose other coil is connected to the direct current system voltage. Thus only the direct current voltages are balanced. If the rectifier station is to be set in operation then at first the ignition of the rectifier must be started by hand or automatically since otherwise no rectifier current exists for the control of the differential relay. After this has been done, the differential relay, in the case of potential equality between the system and the rectifier produces operation of the remote control switch which connects the rectifier leads to the direct current system.

Such an arrangement, however, is not altogether satisfactory because the direct current remote control switch must carry considerable current strength when operating so that it must possess large dimensions and as a result of this, switch operating currents of considerable magnitude must be carried by the sensitive differential voltage relay. Since this relay on account of its great sensitiveness can only be provided with weak switching contacts, many intermediate steps must be provided for stepping up the operating current of the remote control switch.

According to the invention these drawbacks are avoided by means of a differential voltage relay whose one coil is connected to the alternating current side of the rectifier and whose other coil is connected to the direct current system. As soon as potential equality or a predetermined voltage ratio between the alternating current side and the direct current system prevails the differential relay, either directly or through an intermediate relay, closes the ignition circuit of the rectifier. By this arrangement the remote control switch is completely avoided. In its place in a certain degree the controlling device of the ignition circuit is used. This is possible in the arrangement according to the invention since both coils of the differential voltage relay are excited previous to the closing of the ignition circuit, as the one coil is connected to the alternating voltage and the other to the direct current voltage.

In the drawing, there is represented a constructional example of the invention.

The drawing shows a transformer 3 connected to the alternating current system 1 through an oil switch 2 and to a rectifier 4 through the secondary circuit of the transformer. The transformer has winding taps 5 on the high tension side which can be connected or disconnected by the regulating motor 6 according to the value of the alternating current voltage to be regulated. The motor 6 is controlled by means of a contact device 18 which is operated through a gear 19. The transfomer 3 can be set up as a regulable auto transformer or as a three phase transformer with special regulating drive. 7 is the differential voltage relay which in the constructional example is represented as balancing relay. The differential coil 8 is connected to the secondary voltage of transformer 3 whilst the other coil 9 is connected to the voltage of the direct current system 10. The coils 8 and 9 control two magnet cores 11 and 12 which are connected by a balance beam 13 rotatable about the point 14. In the middle of the balance beam 13, contact tongues 15, 16 and 17 are provided. The contact tongues 15 and 17 serve as a reversing switch whereby the motor 6 is caused to be driven in one direction or the other depending on the relation between the voltages of the circuits 1 and 10. The middle contact tongue 16 controls the exciting circuit of an intermediate relay 20, through the contacts 22, which on its part controls the circuit of the ignition transformer 21.

The intermediate relay 20 is appropriately provided with a time delay element such as a dash pot which effects a slow closing of the relay. Through this the balance beam on passing from one extreme position into the other extreme position is prevented from temporarily connecting the ignition circuit of the rectifier by closing the contacts 22. The control current of motor 6 in the case of the constructional example is taken from the secondary side of the transformer 3, it may, however, also be taken from a special transformer or a control battery.

In the first place it may be assumed that the direct current system voltage is higher than the alternating voltage. Under these conditions, the balance beam 13 assumes the position indicated in which the regulating motor 6 in consequence connects several winding taps 5 so that the secondary voltage of the transformer and through this also the excitation of the coils 8 are increased. Through this the coil attracts its magnet core 11 to such an extent, for example, that the contact tongue 17 closes and reverses the connections of the motor 6, and cuts out some of the winding taps 5 so that the alternating voltage is decreased. This process is repeated automatically until substantial potential equality prevails. The balance beam 13 then assumes a horizontal position and through the sliding contact 22 closes the circuit of relay 20 which on its part after a certain time connects the ignition circuit.

In the foregoing it is assumed that the coils of the differential relay are adjusted to potential equality. They can, however, be also adjusted to a predetermined voltage ratio between direct and alternating current voltage. This voltage ratio is then appropriately chosen so that the alternating voltage is higher than the direct voltage to the extent of the voltage drop brought about by the loading of the rectifier.

The switching device according to the invention can be applied equally in the case of glass rectifiers as well as iron rectifiers. In place of the exciting transformer with glass rectifiers, an ignition converter is used with iron rectifiers. Further the arrangement can be so effected that the differential relay in the case of glass rectifiers controls the circuit of the tipping coil which tips the glass container for the purpose of ignition.

What I claim as new and desire to secure by Letters Patent of the United States, is:

1. The combination of direct and alternating current circuits, a vapor arc device connected between said circuits, and means arranged to produce an arc in said device only when a predetermined relation has been established between the voltages of said circuits.

2. The combination of direct and alternating current circuits, a mercury rectifier connected between said circuits and provided with an excitation circuit, and means comprising a differential relay for causing said excitation circuit to be energized only when a predetermined relation is established between the electrical conditions of said direct and alternating current circuits.

3. The combination of a vapor arc device provided with direct and alternating current terminals, means for controlling the relation between the voltages of said direct and alternating current terminals, and means operable to cause an arc to be established in said device only when a predetermined relation has been established between said voltages.

4. The combination of a vapor arc device provided with direct and alternating current terminals, means for controlling the relation between the voltages of said direct and alternating current terminals, and means operable to cause an arc to be established in said device only when a predetermined relation has existed between said voltages for a predetermined time.

5. The combination of a vapor arc device provided with direct and alternating current terminals, and means operable to cause an arc to be established in said device only when a predetermined relation has existed between the voltages of said terminals for a predetermined time.

In witness whereof, I have hereunto set my hand this 5th day of February, 1927.

GUSTAV MEINERS.